(12) United States Patent
Khovaylo et al.

(10) Patent No.: US 7,221,488 B2
(45) Date of Patent: May 22, 2007

(54) PICTURE FRAME SCANNER

(75) Inventors: Modest Khovaylo, Fort Collins, CO (US); Steven Vordenberg, New York, NY (US); Philipp Refior, Brooklyn, NY (US); Clay A. Burns, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 09/960,197

(22) Filed: Sep. 21, 2001

(65) Prior Publication Data

US 2003/0059127 A1 Mar. 27, 2003

(51) Int. Cl.
*H04N 1/04* (2006.01)

(52) U.S. Cl. ............... 358/497; 358/473; 358/474; 358/494

(58) Field of Classification Search ........... 358/497, 358/473, 474, 494, 471, 487, 493, 496; 250/208.1; 382/313; 399/211
See application file for complete search history.

(56) References Cited

U.S. PATENT DOCUMENTS

| | | | | |
|---|---|---|---|---|
| 4,858,003 A * | 8/1989 | Wirt et al. | ......... | 348/110 |
| 5,181,129 A * | 1/1993 | Sato et al. | ......... | 358/494 |
| 5,325,213 A * | 6/1994 | Takahashi et al. | ...... | 358/474 |
| 5,515,137 A * | 5/1996 | Arnold et al. | ......... | 355/40 |
| 5,615,015 A * | 3/1997 | Krist et al. | ........... | 358/296 |
| 5,818,610 A * | 10/1998 | Bromley et al. | ...... | 358/473 |
| 6,057,944 A * | 5/2000 | Takeuchi | ............ | 358/468 |
| 6,208,437 B1 * | 3/2001 | Neushul | ............. | 358/487 |
| 6,233,064 B1 * | 5/2001 | Griffin | ............... | 358/474 |
| 6,271,939 B1 * | 8/2001 | Hu et al. | ........... | 358/497 |
| 6,307,649 B1 * | 10/2001 | Williamson | ........ | 358/474 |
| 6,661,539 B1 * | 12/2003 | Nee | ................... | 358/474 |
| 6,721,072 B1 * | 4/2004 | Tsai et al. | .......... | 358/471 |
| 6,809,842 B1 * | 10/2004 | Tsai et al. | .......... | 358/471 |
| 2001/0000979 A1 * | 5/2001 | Han et al. | .......... | 358/474 |

FOREIGN PATENT DOCUMENTS

| | | |
|---|---|---|
| GB | 2 378 603 | 2/2003 |
| JP | 2000209409 | 7/2000 |
| JP | 2001053918 | 2/2001 |

* cited by examiner

*Primary Examiner*—Jerome Grant
*Assistant Examiner*—Houshang Safaipour

(57) ABSTRACT

A picture frame scanner has a frame defining a display area. The frame is disposed generally upright. A transparent retention pane is mounted within the frame, spanning the display area. A support back spanning the display area is spaced apart from the retention pane. An image scanning bar is operatively mounted in the frame for moving across the display area and scanning an electronic image of media disposed between the support back and the retention pane into memory storage.

45 Claims, 4 Drawing Sheets

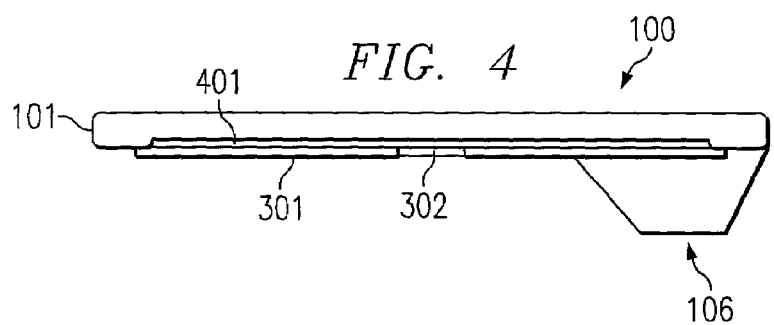
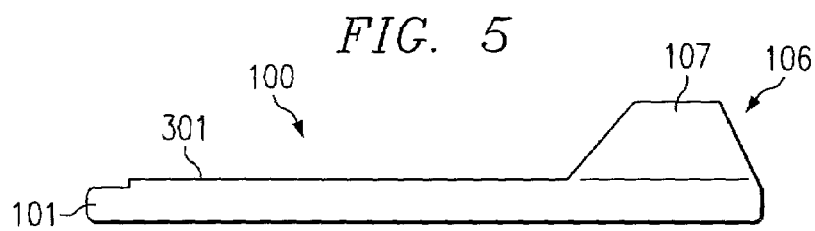
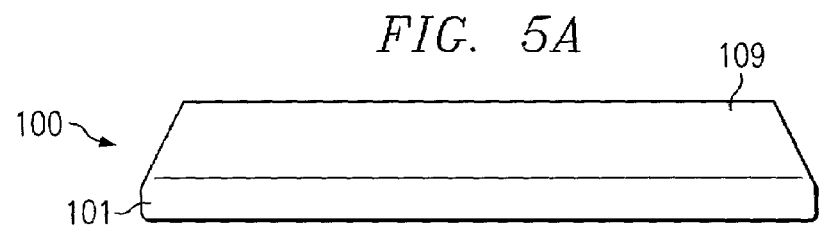
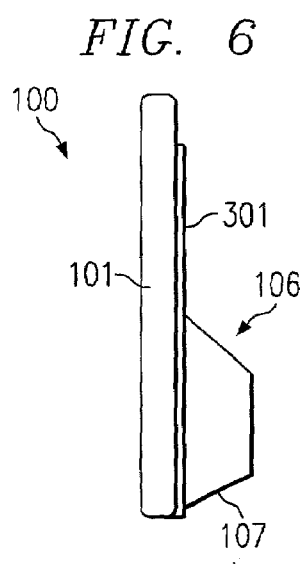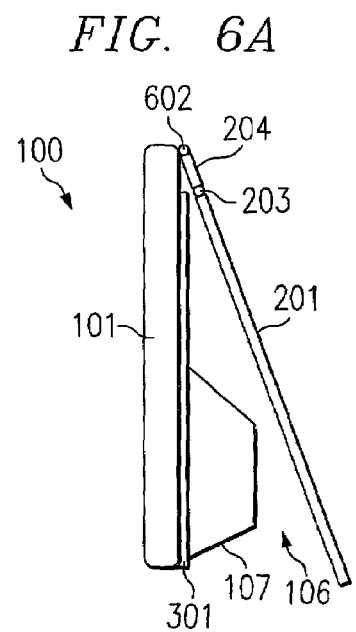

PICTURE FRAME SCANNER

TECHNICAL FIELD

The present invention generally relates to desktop digital image scanners for use by a computer and specifically to a picture frame scanner.

BACKGROUND

Existing scanners are generally handheld, sheet-fed or flatbed. Handheld scanners are held by a user and passed over a document, photo or other media to digitally scan its image. The image quality of a scan performed with a handheld scanner is largely dependent on the steadiness and alignment of the scan pass. Sheet-fed scanners are generally integrated into another device, such as a fax machine; scanning for output to a personal computer or similar device is a secondary function. The quality of images associated with a sheet-fed scanner is largely dependent on the ability of the feed mechanism to handle the article being scanned.

As relatively high resolution flatbed scanners have grown in popularity, handheld scanners have become largely obsolete, while sheet-fed scanners are relegated to the aforementioned secondary role. Existing flatbed scanners are configured similar to a copier. A document cover lid is opened, the item or media to be scanned is placed face down on a document glass or platen and a mechanism disposed beneath the glass is activated to scan a digital image of the media. Typically a document cover is closed over the document, photo or other media to hold the media in place and to shut out ambient light. Necessarily a flatbed scanner has a large "footprint" as it must accommodate a document laid flat.

Computer software, e-mail and Internet traffic have become image intensive. Therefore, the use of scanners has become more prevalent. As scanner technology moves to the desktop, several barriers arise. First, the footprint or the size of the scanning device is not compatible with the fairly well occupied desktop. Hence, potential scanner users must consider the tradeoffs associated with incorporating a new bulky piece of equipment into their computing environment. To address the relatively large footprint of existing flatbed scanners, scaled down versions of scanners, sized to take a four inch by six inch photograph or similar items, have been introduced. These smaller existing scanners have the typical horizontal flatbed architecture or configuration, accepting an item or photograph face down for scanning. Therefore, these smaller flatbed scanner still possess a cumbersome footprint. Additionally, the flatbed scanner is a utilitarian product, it has no function beyond that of scanning images.

SUMMARY OF THE INVENTION

A picture frame scanner has a frame defining a display area. The frame is disposed generally upright. A transparent retention pane is mounted within the frame, spanning the display area. A support back spanning the display area is spaced apart from the retention pane. An image scanning bar is operatively mounted in the frame for moving across the display area and scanning an electronic image of media disposed between the support back and the retention pane into memory storage.

BRIEF DESCRIPTION OF THE DRAWING

FIG. 4 is a top plan view of the scanner of FIG. 1;

FIG. 5 is a bottom plan view of the scanner of FIG. 1;

FIG. 5A is a bottom plan view of the scanner of FIG. 1A;

FIG. 6 is an end elevational view of the scanner of FIG. 1;

FIG. 6A is an end elevational view of the scanner of FIG. 2A;

DETAILED DESCRIPTION

Present picture frame scanner 100 provides multiple functionality. When picture frame scanner 100 is not being used to scan, it preferably displays a photograph or similar planar media while sitting on a desktop, counter top, bookshelf, television set top or other surface, available for viewing.

Figure 1:
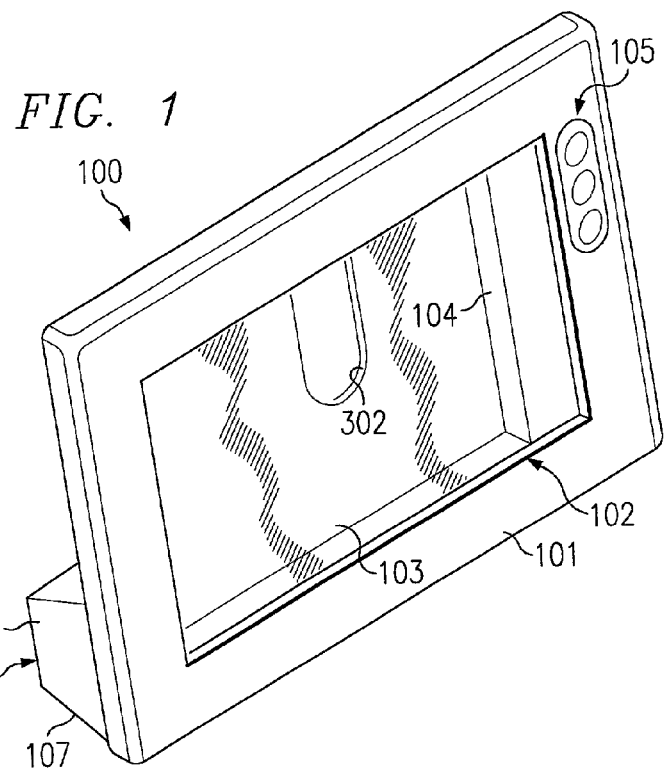
FIG. 1 is a perspective view of a preferred embodiment scanner according to the present invention, disposed in a landscape orientation.
Figure 2:
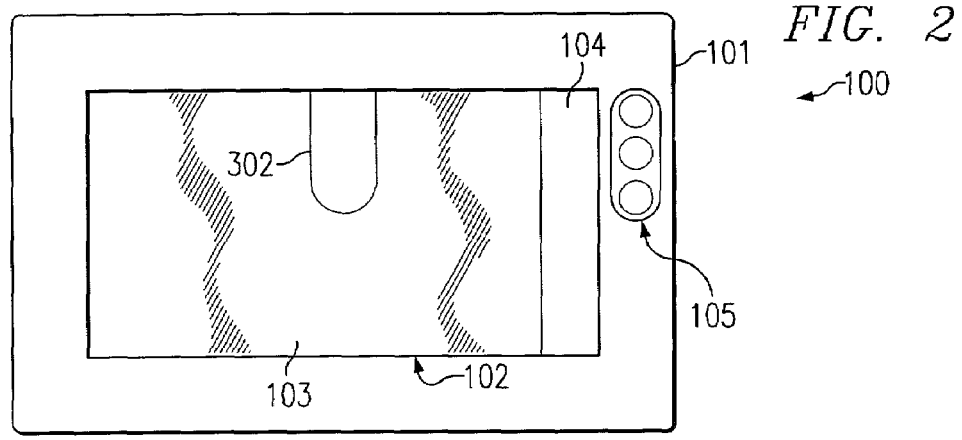
FIG. 2 is a front elevation view of the scanner of FIG. 1.
Figure 3:
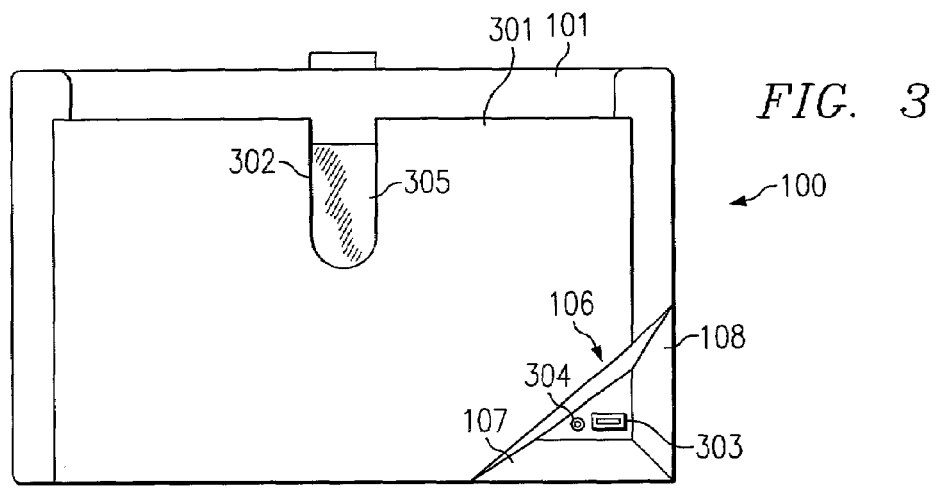
FIG. 3 is a rear elevational view of the scanner of FIG. 1.
Figure 7:
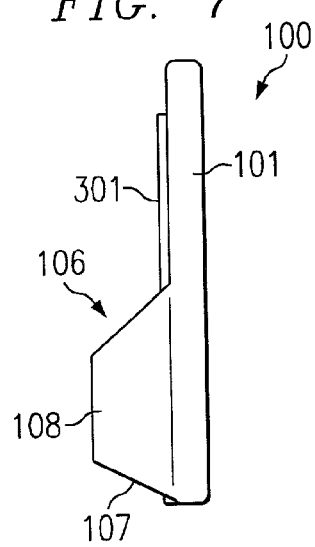
FIG. 7 is an opposite end elevational view of the scanner of FIG. 1.

Turning to the FIGURES, a preferred embodiment of the present invention, picture frame scanner 100, is shown. Picture frame scanner 100 is preferably a contact image sensor (CIS) based digital image scanning device that takes the form of a picture frame. Picture frame scanner 100 sits generally upright on a desktop or a similar surface, slightly tilted back. Turning specifically to FIGS. 1 and 2, picture frame scanner 100 has a frame 101 that defines display area 102. Generally transparent display glass 103 is mounted within frame 101 and spans display area 102. Turning to FIG. 3, support back 301 spans display area 102, behind frame 101. Retention pane 305 spans the display area adjacent to support back 301 within frame 101 and spaced apart from display glass 103. Preferably, media reception slot 401 is defined between support back 301 and retention pane 305 by frame 101, as best seen in FIG. 4. Access opening 302 is preferably defined in support back 301 to facilitate removal and repositioning of a photograph or a similar medium inserted into the scanner, via slot 401. Image scanning bar 104 preferably employs a contact image sensor head. Image scanning bar 104 is operatively mounted in frame 101, preferably between retention pane 305 and display glass 103. During scanning, scanning head 104 moves across display area 102, scanning a photograph or other media disposed between support back 301 and retention pane 305 into internal scanner memory or into remote memory or mass storage. Such remote storage may be associated with a personal computer, set-top box device, an electronic image viewing system or the like connected to scanner 100.

Figure 8:
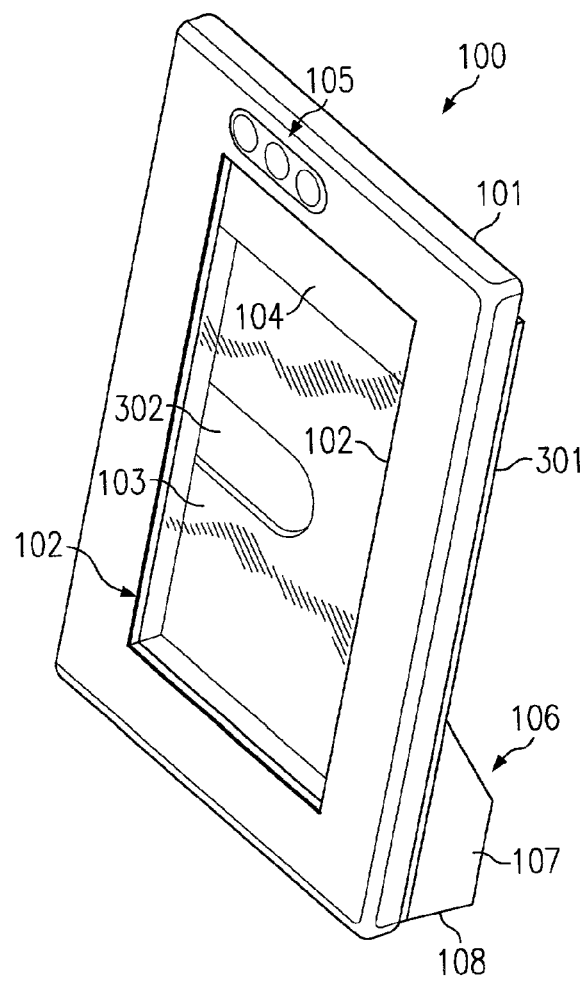
FIG. 8 is a perspective view of the scanner of FIG. 1 according to the present invention, disposed in a portrait orientation.

Preferably, as illustrated in FIGS. 1 and 8, frame 101 is disposed generally upright, preferably tilted back at a slight angle, preferably in the range of 10 to 20 degrees. Beneficially, this provides the desired smaller footprint. As a result of the slight tilt, support back 301 is disposed at a generally acute angle relative to a supporting surface. Thus configured, the scanner functions as, and takes the form of, a picture frame when holding a photograph. So in a singular embodiment, both the footprint problem of a conventional scanner and the added value desired are addressed.

Figure 1A:
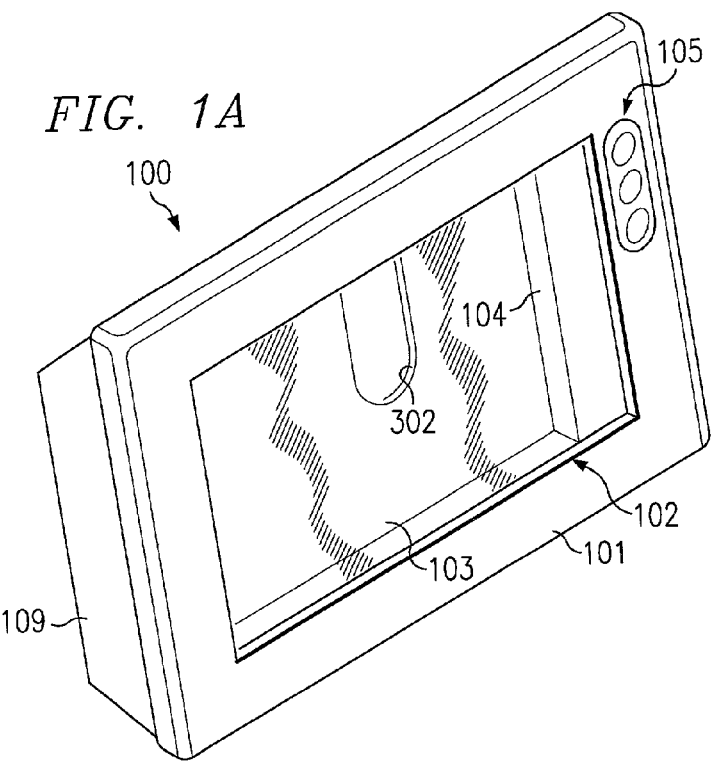
FIG. 1A is a perspective view of an alternative embodiment scanner according to the present invention.

A preferred embodiment of picture frame scanner 100 may be positioned in either a horizontal, landscape picture frame mode, as illustrated in FIG. 1; or in a vertical, portrait picture frame mode, as illustrated in FIG. 8. This facilitates display of either a landscape or portrait photograph or similar media. Deployed in the portrait mode, this embodiment provides an even smaller footprint. Stand 106 extends rearward from a lower corner of frame 101. Preferably stand 106 takes a truncated pyramidal form extending generally horizontal. Thus, as seen in FIG. 1, angled bottom 107 of stand 106 supports scanner 100 in a horizontal or landscape orientation. While in a vertical or portrait orientation, angled side 108 supports scanner frame 101, as shown in FIG. 8. Alternatively, as shown in FIGS. 1A and 5A, support 109 may extend from the lower and one side edge of scanner 100, to support scanner 100 in both landscape and portrait orientations. Another alternative embodiment calls for scanner 100 to be supported in either the landscape or portrait modes by a separate stand.

Scanning head bar 104 preferably incorporates a mechanism to move the scanning head across display area 102 during scanning. Also, scanning bar 104 preferably incorporates a light into its configuration. The light moves with scanning bar 104 to provide illumination needed to scan the photograph or other medium. The bulk of the electronic circuitry associated with scanner 100 is preferably mounted on the scanning head bar 104 in the form of a CIS. However, additional components may be deployed in the periphery of frame 101 or in stand 106. Scanning head 104 is preferably mounted between display glass 103 and retention pane 305 to protect the scanning and movement mechanism from dust and debris. Also, the preferred CIS bar has a low profile configuration. This allows the frame around the displayed photograph to have a minimum height, avoiding a "tunnel" effect when viewing a picture disposed in picture frame scanner 100, facilitating the picture frame function of the present invention.

A number of control buttons are preferably incorporated into frame 101. Alternatively, the buttons may be mounted on the back of frame 101, out of sight for display purposes. Buttons 105 may carry out several functions such as scanning, power, standby or rotation. The scanning button may take different forms, such as separate scanning buttons for scanning to a computer, set-top box or other electronic image viewing system and a button that scans immediately to an e-mail attachment. A rotate button allows a user to rotate a scanned image from landscape to portrait orientation. Alternatively, control of the scanner may be carried out from an attached device such as a computer or set top box, eliminating the need for buttons on the scanner itself. A further alternative embodiment of the present invention incorporates wireless remote control of scanning operation and rotation for convenient use with set-top box based e-mail or Internet browser systems.

One embodiment calls for automatically rotating the scanned image in response to a sensor or sensors deployed in frame 101. Such sensors automatically detect the orientation of entire picture frame scanner 100 and adjust the orientation of the scanner output for properly oriented presentation on a personal computer or an electronic image viewing system, eliminating the need for a rotate button.

Regardless, picture frame scanner 100 preferably simplifies proper orientation of scanned images by providing a guide. If the photo or other object is placed in the scanner for proper viewing the output image will be in the proper orientation, not upside down, and the rotate button or sensors will provide the proper upright orientation.

Turning to FIG. 3, as illustrated, an input/output port 303, such as a universal serial bus (USB) connector is disposed on the back of the picture frame scanner 100. Preferably, port 303 is disposed in the rear of stand 106 as illustrated in FIG. 3, and preferably port 303 offers both I/O capability and power to scanner 100. Hence, preferably a single cable comes into one common corner of the back of scanner 100 in such a manner that the cord lays on the supporting surface when the frame is disposed in either the portrait or landscape orientation. Alternatively, a power supply cord from a transformer is plugged into alternative power input 304.

Picture frame scanner 100 is particularly well adapted to facilitate sharing photographs with friends and family. In operation, a user conveniently slides the photograph or other medium to be scanned into picture frame scanner 100, facing outward, from the top of the scanner. The item is automatically seated into the correct position. Alternatively, a portion of frame 101 may hinge forward to provide more direct access when placing a photograph or other planar item in picture frame scanner 100. Then this mechanism is rotated back, aligning the item for scanning. Preferably, the picture frame scanner may scan in both orientations. The user initiates scanning by pressing one of buttons 105 or through software running on a computer or similar device connected to scanner 100. A digital image of the media disposed in scanner 100 is scanned to memory storage housed in scanner 100 or in the computer or similar device connected to scanner 100.

Alternatively, a portion of frame 101 may accommodate a snap fit cover. Such snap fit covers could employ a wood-like or colored finish. This alternative embodiment may be carried out by a cover or a snap fit alternative to frame 101. In such an alternative embodiment, an underlying frame part may accept the alternative frame face or cover.

Figure 2A:
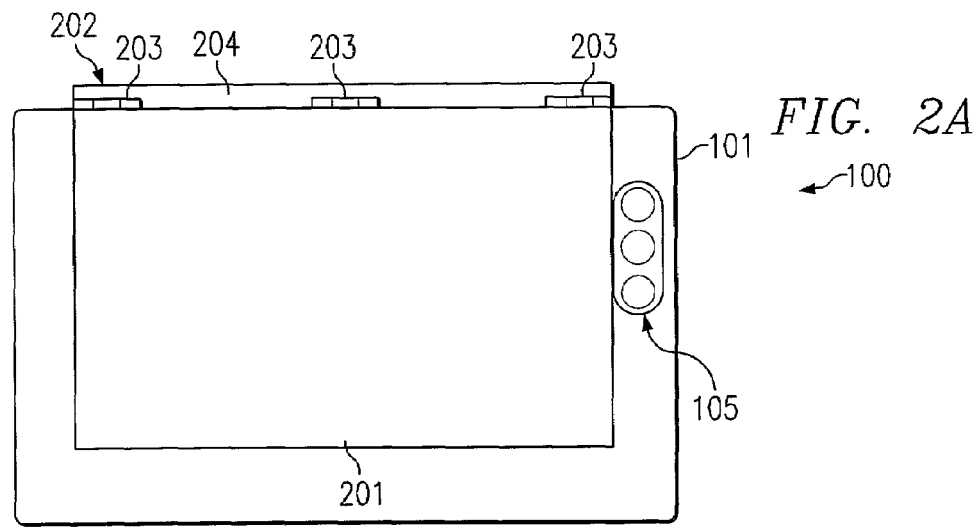
FIG. 2A is a perspective view of an alternative embodiment scanner according to the present invention with a document cover disposed over the display area.

If ambient light is an issue for scanning, another alternative embodiment illustrated in FIGS. 2A and 6A has a document cover 201 that may be attached to frame 101 via hinge 202. Cover 201 is preferably hinged to frame 101 to flip over from the back of frame 101 in preparation for scanning. Hinge 202 is shown as a two-part hinge with first hinges 203 hinging cover 201 to hinge plate 204 that is, in turn, hinged to frame 101 by second hinges 602.

A further alternative method to deal with ambient light is treating display glass 103 in various manners. By way of example, polarized glass may be used for display glass 103. Ambient light generally comes from the top of picture frame scanner 100. Polarized glass may be used to shield the photograph from a portion of the light coming from a particular angle, such as from above picture frame scanner 100. Alternatively, an electrically opaquing glass may be employed as display glass 103, activated by initiation of the scanning process.

Another alternative embodiment of the present invention employs a liquid crystal display (LCD) as support back 301. The LCD is adapted to display electronic images through display glass 103 when an item is not being displayed. A support back in the form of an LCD should not include an access opening as illustrated. The display images are preferably images scanned by picture frame scanner 100 and stored in memory disposed within the picture frame scanner. However, images may originate from a computer connected to picture frame scanner 100, via port 303.

What is claimed is:

1. A picture frame scanner comprising:
   a frame defining a display area, said frame disposed generally upright;

a transparent retention pane mounted within said frame, spanning said display area;

a support back spanning said display area, said support back spaced apart from and adjacent to said retention pane; and an image scanning bar operatively mounted in said frame for moving across said display area and scanning an electronic image of an item into memory storage, said item being lighted and that is disposed between said support back and said retention pane.

2. The picture frame scanner of claim 1 wherein said memory storage is located within said picture frame scanner.

3. The picture frame scanner of claim 1 wherein said memory storage is located on an external computer.

4. The picture frame scanner of claim 1 wherein said scanner is selectively deployable in landscape and portrait orientations.

5. The picture frame scanner of claim 4 wherein said scanner scans when deployed in either of said landscape and portrait orientations.

6. The picture frame scanner of claim 4 further comprising a stand extending rearwardly from a lower corner of said frame, said stand selectively maintaining said scanner in said landscape and portrait orientations.

7. The picture frame scanner of claim 1 further comprising a rotation selection control for rotating said electronic image.

8. The picture frame scanner of claim 7 wherein said rotation control is a user operative control mounted on said scanner.

9. The picture frame scanner of claim 7 wherein said rotation control is a user operative wireless remote control.

10. The picture frame scanner of claim 7 wherein said rotation control is a sensor disposed in said frame for operatively sensing an orientation of said frame and rotating said electronic image to have an orientation for viewing.

11. The picture frame scanner of claim 1 wherein said frame is disposed at a slight angle, and said support back is disposed at an acute angle relative to a supporting surface on which said scanner rests.

12. The picture frame scanner of claim 11 wherein said slight angle is in the range of 10 to 20 degrees and said acute angle is in the range of 80 to 70 degrees.

13. The picture frame scanner of claim 1 wherein said frame, said support back and said retention pane define an item receptive slot for selective user insertion into and removal of said item from said frame between said support back and said retention pane.

14. The picture frame scanner of claim 1 wherein said image scanning bar extends across said display area and comprises a light for lighting said item during scanning and a mechanism to move said bar across said display area to scan said item.

15. The picture frame scanner of claim 1 further comprising a display glass mounted within said frame, spanning said display area, spaced apart from said retention pane.

16. The picture frame scanner of claim 15 wherein said image scanning bar is operatively mounted between said retention pane and said display glass.

17. The picture frame scanner of claim 15 wherein said display glass is treated to at least in part keep out ambient light during said scanning.

18. The picture frame scanner of claim 17 wherein said wherein said display glass pane is polarized.

19. The picture frame scanner of claim 15 wherein said wherein said display glass comprises electronically opaquing glass activated by initiation of said scanning.

20. The picture frame scanner of claim 1 wherein said support back comprises an electronic display panel for displaying electronic images through said retention pane when an item is not disposed between said support back and said retention pane.

21. The picture frame scanner of claim 20 wherein said images are images scanned by said scanner and stored in memory disposed in said scanner.

22. The picture frame scanner of claim 20 wherein said images are stored on a computer connected to said picture frame scanner.

23. The picture frame scanner of claim 1 further comprising controls mounted on said frame.

24. The picture frame scanner of claim 23 wherein said controls are mounted on a front surface of said frame.

25. The picture frame scanner of claim 23 wherein said controls are mounted on a rear surface of said frame.

26. The picture frame scanner of claim 23 wherein said controls comprise at least one of a group consisting of: a power button; a standby button; a scan initiation button; an image rotation button a scan to computer button; and a scan to email attachment button.

27. The picture frame scanner of claim 1 wherein said frame comprises a hinged access portion operatively opening to receive said item to be scanned operatively closing for scanning of said item.

28. The picture frame scanner of claim 1 wherein said frame is adapted to selectively receive snap fit covers.

29. The picture frame scanner of claim 1 further comprising a document cover hinged to said frame, operative to cover said display area during scanning.

30. A method for displaying and scanning an item, said method comprising the steps of:

supporting said item to be scanned, generally upright in a frame on a first side of a first transparent pane;

retaining said item within said frame for display and scanning;

moving an image scanning bar over said item, wherein the bar is moved on a second side of the first transparent pane between the fist transparent pane and a second transparent pane during scanning; and scanning an electronic image of said item into memory storage.

31. The method of claim 30 wherein said scanning step further comprises the step of selectively initiating said scanning.

32. The method of claim 30 wherein said scanning step further comprises the step of storing said electronic image in remote memory storage.

33. The method of claim 30 wherein said supporting step further comprises the step of disposing said item at a slight angle relative to vertical.

34. The method of claim 30 wherein said scanning step further comprises the steps of: lighting said item; and moving a image scanning bar over said item.

35. The method of claim 30 further comprising the step of displaying an electronic image when an item is not disposed in said frame.

36. The method of claim 30 further comprising the step of: disposing said item to be scanned in said frame facing outward.

37. A system for displaying and scanning an item, said system comprising:

means for supporting and seating, generally upright, an item to be scanned and displayed such that a lower edge of the item rests upon the means for supporting;

means for moving an image scanning bar over said item;

means for scanning said item into memory storage; and
a transparent pane over which the item lies during scanning and means for selectively electronically displaying images through the pane when an item is not overlying the pane.

38. The system of claim 37 further comprising means for selectively initiating scanning of said item by said scanning means.

39. The system of claim 37 wherein said memory storage is located external to said system.

40. The system of claim 37 wherein said supporting means disposes said item at an acute angle, relative to vertical.

41. The picture frame scanner of claim 1 further comprising a seat configured to engage a lower edge of the item to support the item opposite the display area during scanning while in a generally upright position.

42. The picture frame scanner of claim 15, wherein the scanning bar is configured to emit light in a direction towards the support back and wherein the display glass is on an opposite side of the scanning bar as the support back.

43. The picture frame scanner of claim 15, wherein the scanning bar is configured to move between the display glass and the retention pane while moving across the display area.

44. The picture frame scanner of claim 29, wherein the document cover is opaque.

45. The method of claim 30 further comprising the item, generally upright such that a lower edge of the item rests upon a seat.

* * * * *

UNITED STATES PATENT AND TRADEMARK OFFICE
CERTIFICATE OF CORRECTION

PATENT NO. : 7,221,488 B2  Page 1 of 1
APPLICATION NO. : 09/960197
DATED : May 22, 2007
INVENTOR(S) : Modest Khovaylo et al.

It is certified that error appears in the above-identified patent and that said Letters Patent is hereby corrected as shown below:

In column 5, line 64, in Claim 18, delete "wherein said" before "display".

In column 5, line 66, in Claim 19, delete "wherein said" before "display".

In column 6, line 40, in Claim 30, delete "fist" and insert -- first --, therefor.

In column 6, line 53, in Claim 34, delete "claim 30" and insert -- claim 30, --, therefor.

In column 6, line 55, in Claim 34, delete "a" and insert -- the --, therefor.

In column 6, lines 57-58, in Claim 35, delete "when an item is not disposed in said frame" and insert -- through the second transparent pane --, therefor.

In column 8, line 6, in Claim 43, after "wherein the" insert -- image --.

Signed and Sealed this

Sixteenth Day of June, 2009

JOHN DOLL
*Acting Director of the United States Patent and Trademark Office*